US011860917B1

(12) United States Patent
Dubey et al.

(10) Patent No.: US 11,860,917 B1
(45) Date of Patent: Jan. 2, 2024

(54) CATALOG ADOPTION IN PROCUREMENT

(71) Applicant: Accenture Global Solutions Limited, Dublin (IE)

(72) Inventors: Manisha Dubey, New Delhi (IN); Suket Kumar Jain, Maharashtra (IN); Rajnikant Dutt, New Delhi (IN); Kanakalata Narayanan, Bangalore (IN); Siddesha Swamy, Bangalore (IN); Ranjan Kumar Jena, Odisha (IN); Manish Sharma Kolachalam, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/899,318

(22) Filed: Aug. 30, 2022

(51) Int. Cl.
*G06F 16/30* (2019.01)
*G06F 16/33* (2019.01)
*G06N 3/08* (2023.01)
*G06F 16/34* (2019.01)
*G06N 3/0442* (2023.01)

(52) U.S. Cl.
CPC ........ *G06F 16/3347* (2019.01); *G06F 16/345* (2019.01); *G06N 3/08* (2013.01); *G06N 3/0442* (2023.01)

(58) Field of Classification Search
CPC ..... G06F 16/3347; G06F 16/345; G06N 3/08; G06N 3/0442
See application file for complete search history.

(56) References Cited

U.S. PATENT DOCUMENTS

| 2019/0080225 A1* | 3/2019 | Agarwal | G06N 3/044 |
| 2021/0073224 A1* | 3/2021 | Zhao | G06F 16/2237 |

OTHER PUBLICATIONS

Article entitled "Semantic Product Search for Matching Structured Product Catalogs in E-Commerce", by Choi et al.,, dated Aug. 18, 2020 (Year: 2020).*
Article entitled "An improvement on E-Commerce Search Engine for Automotive Parts Industry Using Siamese Neural Network with Triplet Loss and Contrastive Loss by Training Catalog Item Embeddings" by Chun et al., dated 2022 (Year: 2022).*
Article entitled "Using Triplet Loss and Siamese Neural Networks to Train Catalog Item Embeddings", by Ramachandran, dated Sep. 8, 2021 (Year: 2021).*

* cited by examiner

*Primary Examiner* — Mahesh H Dwivedi
(74) *Attorney, Agent, or Firm* — Crowell & Moring LLP

(57) ABSTRACT

A system and method provide a trained model that uses vectorized word embeddings that are averaged or summed to form representations for sentences and phrases. The representations are processed in a Siamese neural network including multiple LSTM stages to find semantically related matches in catalogs for non-catalog queries. The model is trained using catalog data and randomized data using a contrastive loss function to generate similarity metrics for catalog-non-catalog pairs.

18 Claims, 7 Drawing Sheets

Unlabeled phrase vector embedding 315

| -0.95204 | -0.71613 | -0.43377 | 0.366132 |
| -0.93313 | -0.68172 | -0.18964 | 0.395231 |
| -0.93242 | -0.60741 | -0.05093 | 0.888351 |
| -0.77371 | -0.56960 | 0.168485 | 0.976249 |

Randomized

Unlabeled random vector embedding 320

| -0.93313 | -0.68172 | -0.18964 | 0.395231 |
| -0.95204 | 0.366132 | -0.43377 | -0.71613 |
| -0.77371 | -0.56960 | 0.168485 | 0.976249 |
| 0.888351 | -0.60741 | -0.05093 | -0.93242 |

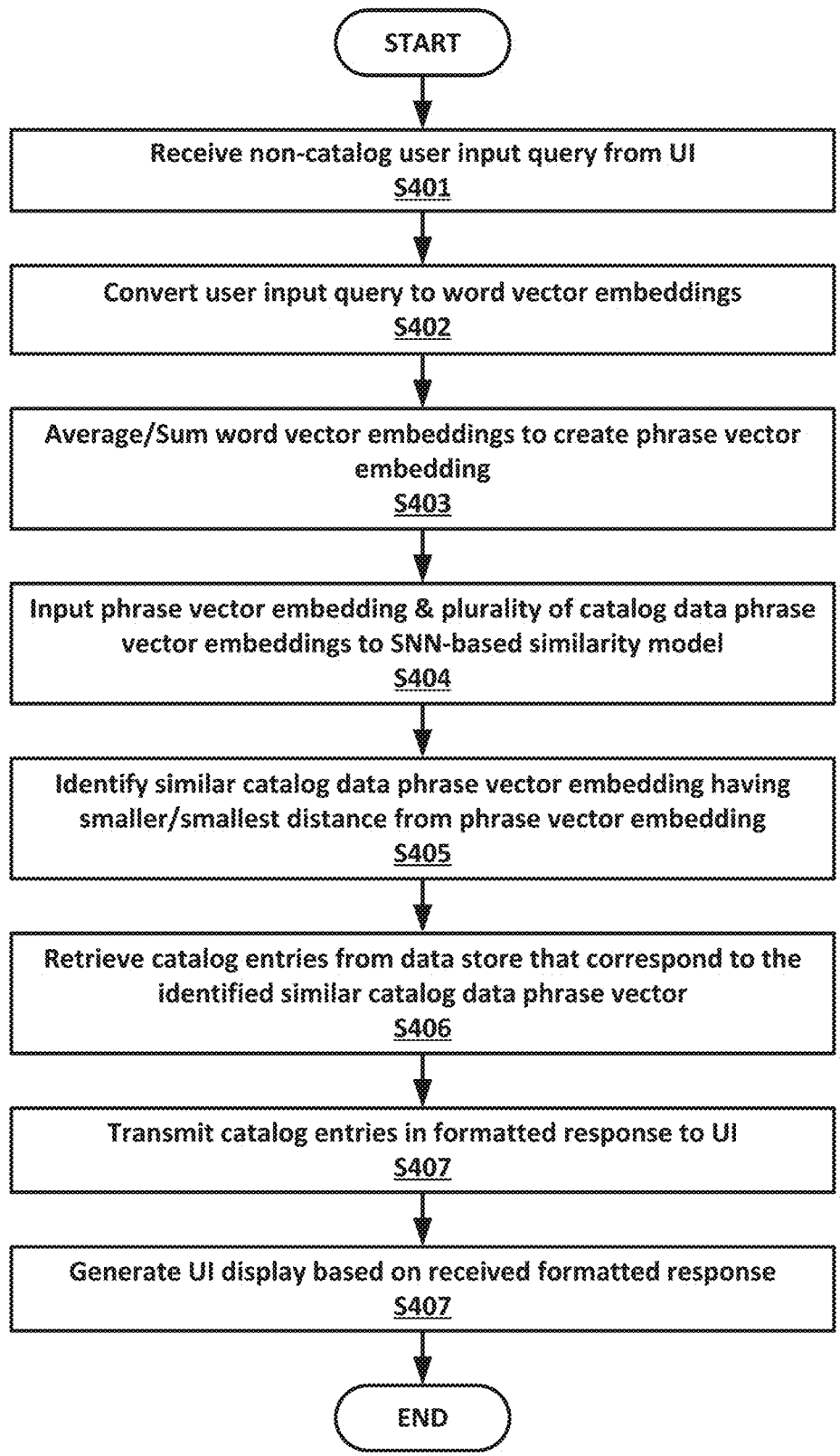

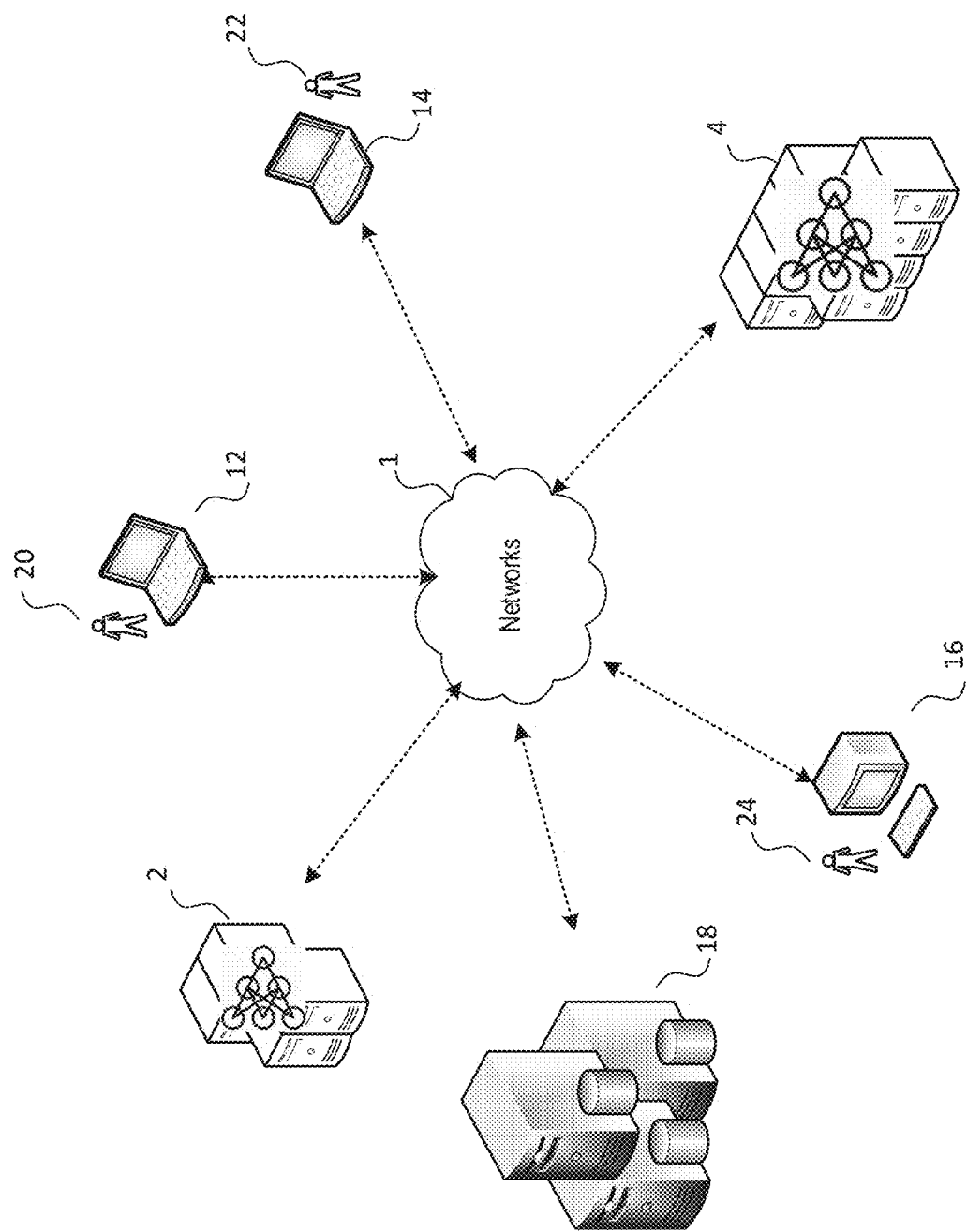

CATALOG ADOPTION IN PROCUREMENT

TECHNICAL FIELD

This disclosure relates to applying machine learning techniques to information retrieval and more specifically, to string comparison for large, sparse datasets.

BACKGROUND

Present catalog search and management systems suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

FIG. 3B illustrates an example pair of an unlabeled phrase vector embedding and an unlabeled random vector embedding generated from the unlabeled phrase vector embedding.

FIG. 4 illustrates a flow diagram of an example use case of the catalog search and management system.

FIG. 5 illustrates an example electronic communication environment for implementing the catalog search and management system.

DETAILED DESCRIPTION

Figure 1:
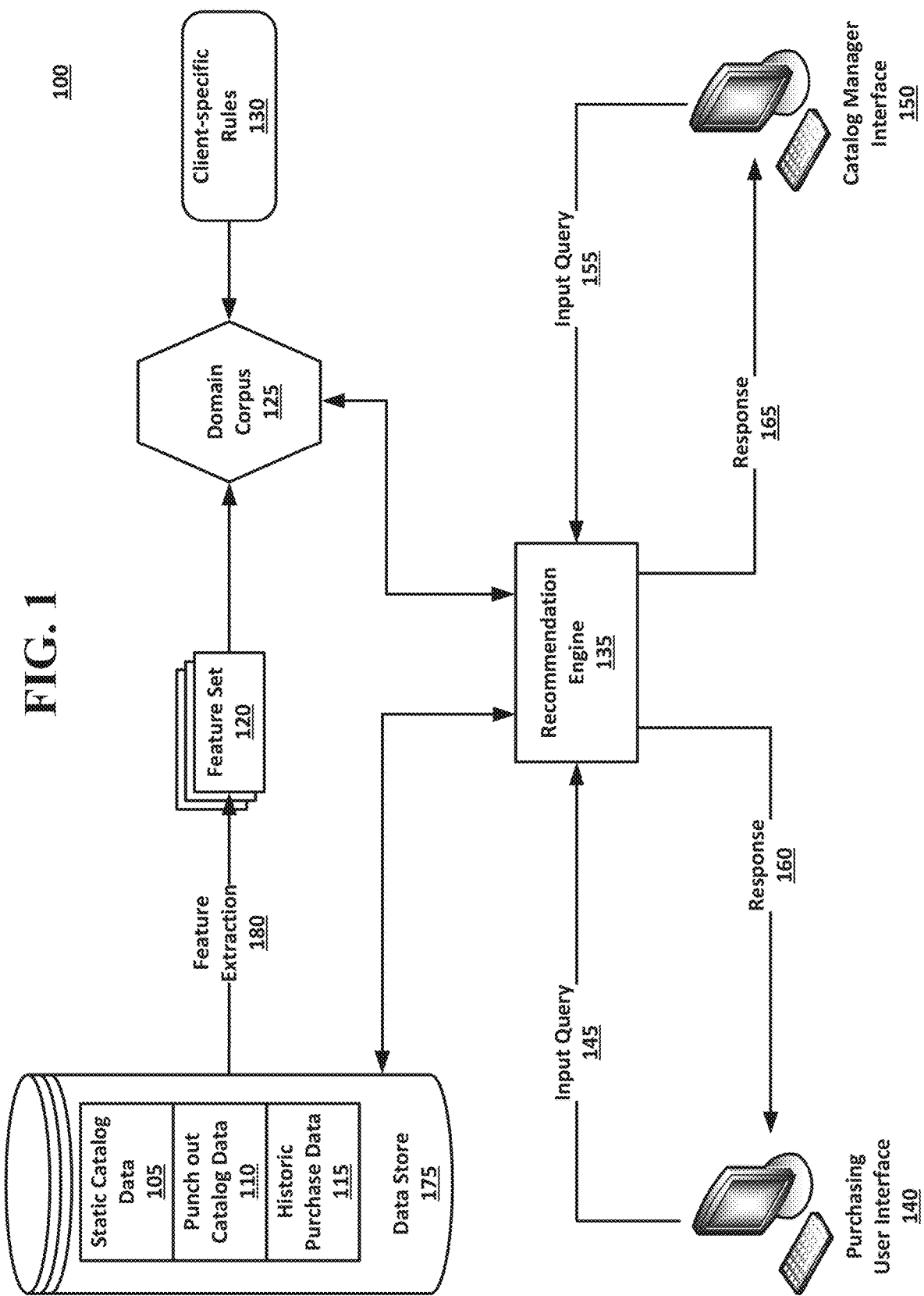
FIG. 1 illustrates an example catalog search and management system.

According to some embodiments, a system includes a processor; a memory in communication with the processor, the memory storing a plurality of instructions executable by the processor to cause the system to: receive a non-catalog query from a user interface; compare the non-catalog query with a plurality of catalog data vector embeddings stored in a domain corpus using a similarity machine learning model comprising a Siamese neural network; map the non-catalog query to a semantically similar catalog data vector embedding of the plurality of catalog data vector embeddings using the similarity machine learning model; retrieve an item entry from a data store using the semantically similar catalog data vector embedding, wherein the item entry comprises a description and a supplier of an item; generate a response to the non-catalog query comprising the retrieved item entry; and transmit the response to the user interface.

According to some embodiments, a method of training a machine learning similarity machine learning model includes generating a first plurality of word vector embeddings from a phrase retrieved from an unstructured data volume, wherein the phrase comprises a plurality of words; generating a second plurality of word vector embeddings from a random selection of values from the first plurality of word vector embeddings; averaging or summing the first plurality of word embeddings to generate an unlabeled phrase vector embedding; averaging or summing the second plurality of word embeddings to generate an unlabeled random vector embedding; inputting the unlabeled phrase vector embedding and the unlabeled random vector embedding into a two parallel input paths of a similarity machine learning model; and generating an output from the similarity machine learning model.

One interesting feature of the systems and methods described herein may be that it improves the performance and accuracy of searching of items represented in a catalog-like data store. Alternatively, or in addition, an interesting feature of the systems and methods described herein may be that both catalogued and non-catalogued items may be recommended to a user based on an input query. Alternatively, or in addition, an interesting feature of the systems and methods described herein may improve management of items represented in the catalog-like data store by generating recommendations to add non-catalogued items and to revised poorly utilized catalogued items. Alternatively, or in addition, an interesting feature of the systems and methods described herein may recommend a supplier for a desired item.

As used herein, the term "item", whether used in the context of catalog or non-catalog, refers to products and/or services that a user may inquire about procuring.

As used herein, the term, "non-catalog" refers to items or requests or acquisitions having no defined contract, catalog entries or items, and/or nomenclature available, such that the user may add and define the non-catalog item while ordering it rather than retrieve a predetermined catalog item description.

FIG. 1 illustrates an example search and management system 100 according to the present subject matter. The system 100 may include a data store 175, a domain corpus 125, a feature set 120, a recommendation engine 135, a purchasing user interface 140, and a catalog manager interface 150. The data store 175 may store static catalog data 105, punchout catalog data 110, and historic purchase data 115.

The static catalog data 105, punchout catalog data 110, and historic purchase data 115 may be processed according to a feature extraction process 180 to produce the feature set 120. The extracted feature set 120 may be used in training the domain corpus 125, which will be subsequently described. The recommendation engine 135 may be communicably coupled to the purchasing user interface 140, catalog manager interface 150, and the domain corpus 125. Client-specific rules 130 may be communicably coupled to the domain corpus 125.

The data store 175 may provide storage of static catalog data 105, punchout catalog data 110, and historic purchase data 115. In an example embodiment, the data store 175 may generally store a plurality of item entries in a catalog-like format. The static catalog data 105 may include a master file of items and services along with associated data fields indicating approved supplier(s), descriptions, category information, pricing, and validity of the catalog. Catalogs may be global/company-wide or region/country specific. In some cases, there may be more granular levels at which catalogs are created, depending on the organization. Punch out catalog data 110 may include catalog-like data scraped from crawling supplier websites, social media, e-mails, supplier portals, and the like. Historic purchase data 115 may include past purchases and spending data across an organization, for example. The historic purchase data 115 may be organized using data fields such as, supplier(s), description, pricing, quantity, category, whether the item was listed in a catalog, and the purchasing unit. Items which are bought outside the catalog are termed non-catalog items. Non-catalog items may not be found in either the static catalog data 105 or punch out catalog data 110. The non-catalog items may have been purchased from the vendor without negotiation of price because of unavailability of item and a lack of semantic search.

In general, the volume of data stored in data store 175 may contain millions of textual item entries and may be at least partially unstructured. By unstructured, the stored item entries may not be consistent or uniform in description, length, ordering, punctuation, capitalization, and the like. In some cases, the data may be duplicative in that a single item may be referenced by more than one representative item and description. The data stored in data store 175 may be non-uniformly categorized and/or not well-defined. For instance, some represented items may not contain the same data fields as other represented items, while other represented items may be incorrectly categorized. The descriptions and other textual aspects of the represented items may be generally described with non-sentences, such as short phrases, acronyms, shorthand, or run-on sentences. Attempts to use conventional pre-trained embeddings at a sentence level used for semantic analysis and similarity were found to perform unacceptably. Given the free-text and sparse nature of the data, this demonstrated a need for the techniques disclosed in accordance with the present subject matter to achieve improved accuracy and performance in semantically processing a large, unstructured data store containing millions of records.

Client-specific rules 130 may specify constraints to a weighted optimization rule to better identify suppliers of items that are more suitable than other suppliers with a given set of requirements, such as quantity, availability, shipping speed, pricing, and the like.

The recommendation engine 135 may operate based in-part on executing a trained similarity model, the training of which will be subsequently described with reference to FIG. 3A. The recommendation engine 135 may operate in the backend to service input queries transmitted from a frontend interface displayed on each of the purchasing user interface 140 and the catalog manager interface 150. In response to receiving an input query 145 from the purchasing user interfaced 140, the recommendation engine 135 may pre-process the input query 145 and compare against the domain corpus 125 to predict a catalog item or variant of a catalog item during a non-catalog procurement process. Comparing the pre-processed input query 145 with catalog data vector embeddings of the domain corpus 125 may cause the input query 145 to be mapped to one or more semantically similar or matching phrases. The recommendation engine 135 may then use the matching phrase(s) to retrieve the corresponding complete item entries from the data store 175, including the item description and its associated data fields for each of the one or more matching items. The matching items and associated data fields may then be returned to the requesting interface 140/150 in a response 160/165 and displayed graphically in a table format, such as Table 1 or Table 2 shown below.

The domain corpus 125 may provide a reference to which input queries 145/155 from users may be compared against to predict the catalog item or non-catalog item that a user is searching for. The domain corpus 125 may contain a variety of data fields associated with each catalog and non-catalog item, including for instance, a supplier field 225, a commodity class field 230, a validity class field 235, a unit price field 245, a line type 250, a purchasing unit 255, and product attributes 260. These data fields may be used to further rank suppliers and catalog recommendations. The domain corpus 125 may confirm and/or translate a user input query 145/155 to a semantically similar phrase that may be subsequently used to retrieve corresponding item entries from the data store 175. Following the comparing and identification of a semantically similar phrase to the user input query 145/155, the data store 175 may be referenced by the recommendation engine 135 using the semantically similar catalog data vector embeddings identified using the domain corpus 125 to retrieve the corresponding catalog item entries, including as the information populated in the previously described data fields of the static catalog data 105, the punch out catalog data 110, and the historic purchase data 115. Table 1 below shows an example of how a user-submitted input query 145 may be matched to similar catalog and non-catalog items through referencing the domain corpus 125 to establish a "DescriptionMatch" followed by retrieving additional data from data store 175 for each similar item.

TABLE 1

| Input Query | DescriptionMatch | Supplier | Catalog/ Non-Catalog | Commodity | Price |
|---|---|---|---|---|---|
| CC 65713- TCS- Offshore | CSC India Offshore Tech Lead | CSC Financial | Catalog | IT Consulting | $13,125 |
| — | Offshore Data Analyst | Capgemini America Inc | Non-Catalog | IT Consulting | $25,800 |
| — | Offshore Test Analyst | Capgemini America Inc | Catalog | IT Consulting | $30,576 |
| — | IT Consultant | iPipline Inc | Catalog | IT Consulting | $58,800 |

The purchasing user interface 140 may be operated by a user who is searching for an item or service to purchase as part of the enterprise-level procurement system, for example. In an example embodiment, the purchasing user interface 140 may allow a user to input an alphanumeric query. The query may be generated textually or graphically using on-screen menus, previous search queries, and the like. The purchasing user interface 140 may be operated to inquire and search for both catalog and non-catalog items. Specifically, upon entry by the user, the purchasing user interface 140 may transmit an input query 145 to the recommendation engine 135. Similarly, the purchasing user interface may be configured to receive a response 160 that may include a recommended item or variant along with various item metrics. The response 160 may be formatted by the purchasing user interface 140 for display in a table or spreadsheet, for example. The purchasing user interface 140 may also allow a user to examine and manipulate the underlying similarity model constraints and parameters in a dynamic manner.

Following processing by the recommendation engine 135 in response to an input query 145, a response 160 may be returned that ranks suppliers of a predicted item according to criteria including: whether the item is a catalog or non-catalog item, supplier reliability, delivery time, frequency for which the item has been purchased from each supplier, pricing, and the like. Each supplier of a predicted item may be assigned the overall ranking based on a score in each of the aforementioned criteria. While the ordered list of suppliers displayed to a user of the purchasing user interface 140 may be based on the overall ranking, the user may change the ordered list by interactively identifying alternate criteria deemed more desirable.

Table 2 below shows an example ranked list of suppliers and associated data that results from submitting an input query 145.

TABLE 2

| Supplier  | OTD     | Price  | Perf                     | Contracted | Overall Rank | Reason                 |
|-----------|---------|--------|--------------------------|------------|--------------|------------------------|
| Supplier1 | 2 weeks | $1000  | Repeated purchase        | Yes        | 6            | Ideal                  |
| Supplier2 | 3 weeks | $800   | Repeated purchase        | No         | 5            | Low price              |
| Supplier3 | 1 week  | $1200  | Non-repeated purchase    | No         | 4            | Short shipping delay   |

The catalog manager interface 150 operates similarly to the purchasing user interface 140 but is designed and configured for a different user. The catalog manager interface 150 may allow a user to similarly submit input queries 155 with the goal of improving the operation of the recommendation engine 135 by making changes to the data of data store 175. Specifically, the catalog manager interface 150 may receive responses 165 from the recommendation engine 135 offering catalog insights, such as suggesting frequently purchased non-catalog items be included the domain corpus 125 or that unused catalog items be omitted from the domain corpus 125. In an example embodiment, the catalog management interfaced 150 may provide a procurement analytics dashboard through which a user may make decisions to manage the catalog. For example, the catalog manager interface 150 may inform a user that a particular spare part is seldom requested, and the recommendation engine 135 may suggest omitting this item from the catalog. Using the catalog manager interface 150, a user may then submit an input query 155 to the recommendation engine to delete the spare part from the catalog.

Figure 2:
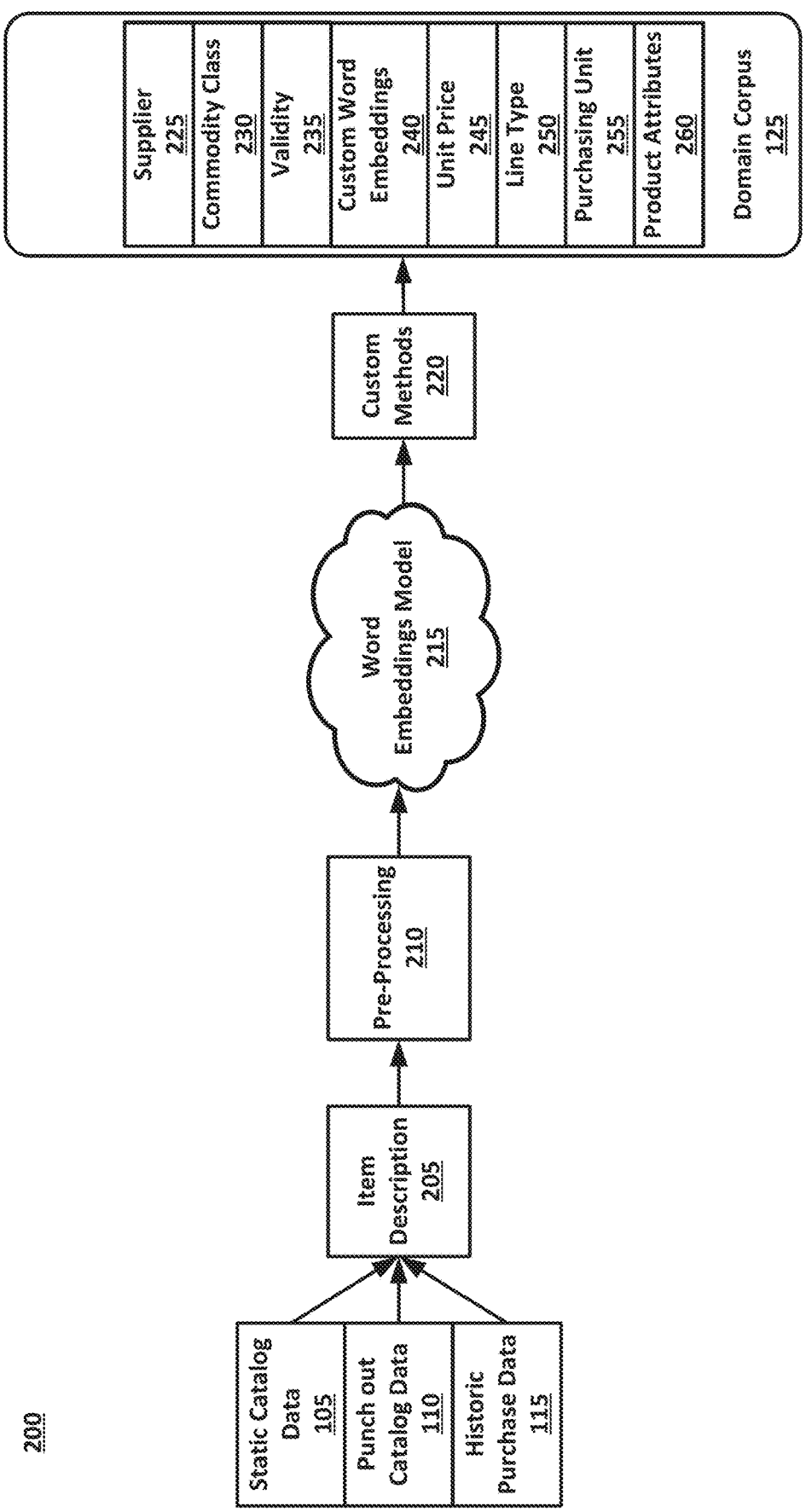
FIG. 2 illustrates a block diagram of an example of a control unit.

FIG. 2 is an example block diagram 200 to train the domain corpus 125. To begin, the data sets previously discussed, including the static catalog data 105, punch out catalog data 110, and historic purchase data 115 may be collated into a single volume of line description phrases 205, followed by pre-processing 210, and trained on a word embeddings model 215 to generate custom word embeddings 240. In an example, the word embeddings model 215 may be implemented using Word2Vec, which is a commonly used methodology to obtain semantically relevant representations for words in a phrase. The Word2Vec algorithm accepts a pre-processed text as input and provides a vector representation of each word as output. The word embeddings model 215, such as Word2Vec or other comparable algorithm to generate word embeddings, may generate a representation for the line description phrases for each catalog item. Each of the generated line description phrases may be associated with corresponding metadata to form the domain corpus 125. Product attributes may also be extracted from the domain corpus using a combination of regular expressions and manual labeling. Example attributes extracted may be brand, model, and specification.

Pre-processing 210 may receive the collated static catalog data 105, punch out catalog data 110, and historic purchase data 115 as input and may apply a variety of techniques to transform and/or normalize the collated data. These techniques may include tokenization, which may segment running text into phrases and words; removing non-alphanumeric characters, removing stop words, and converting all letters to lowercase.

The word embeddings model 215 may receive the pre-processed text as input and create a vector representation, also known as a vector embedding, of each word as output. In this way, a semantically relevant representation for all words in the pre-processed text input may be generated.

Custom methods 220 may include training a similarity machine learning model using a Siamese neural network (SNN), as will be further described with reference to FIG. 3A.

Figure 3A:
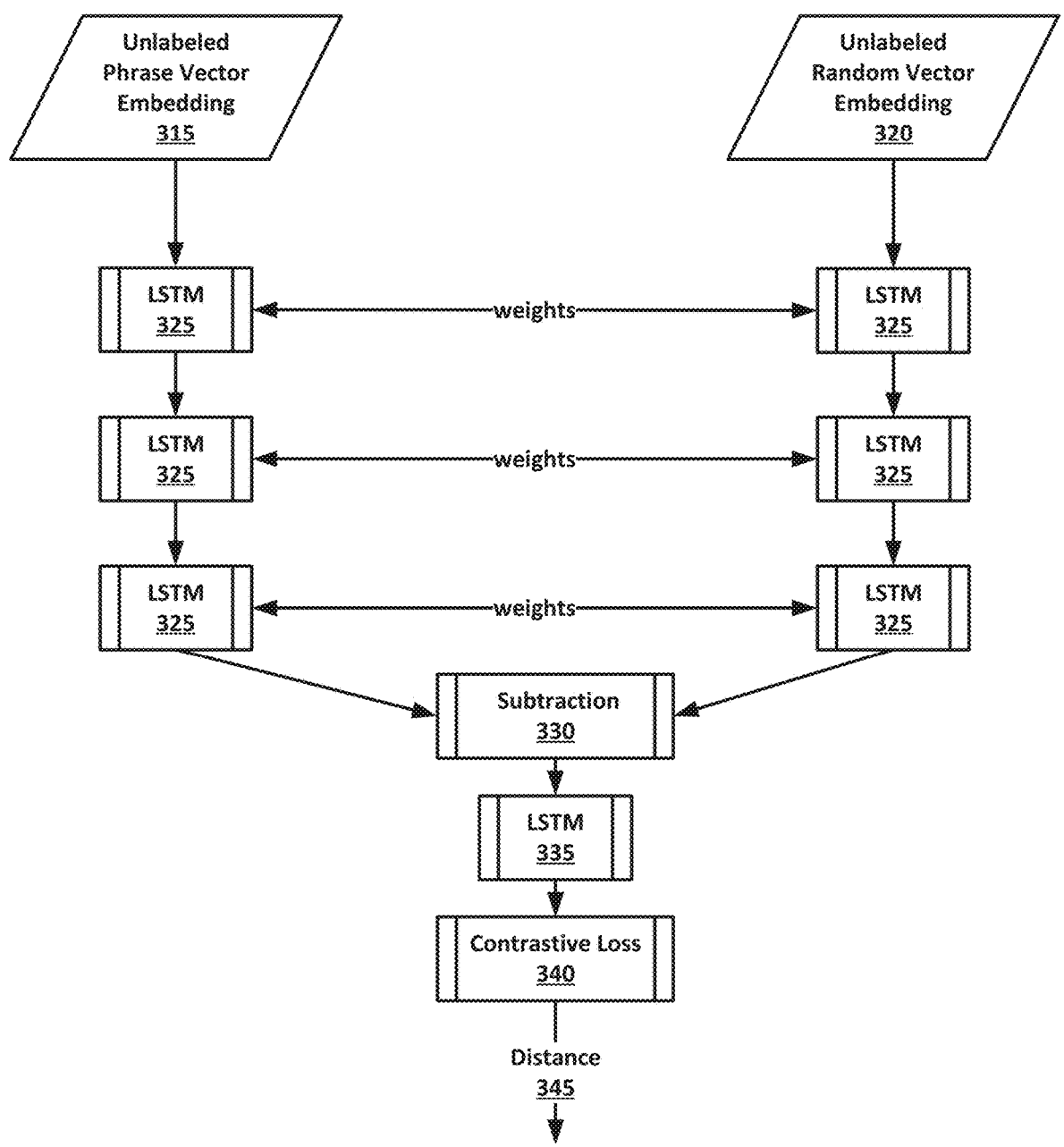
FIG. 3A illustrates a flow diagram of an example of the logic of a control unit.

FIG. 3A shows an example block diagram of a training technique 300 to train a similarity machine learning model that may be subsequently utilized by the recommendation engine 135. In general, the similarity model may be trained using a long short-term memory (LSTM)-based SNN, with contrastive loss, to discriminate between real item description phrases and synthetic (random) item description phrases. In this way, the model may be trained to differentiate between actual and random data by outputting a distance metric between the inputted embeddings.

As previously suggested, two sample data sets may be prepared for training the similarity model. A first sample data set may include phrases sourced from real catalog item descriptions. The phrases may be processed using the trained word embeddings model 215 to generate vector embeddings of each word in each phrase. The generated vector embeddings of each word in each phrase may then be summed or averaged to capture an overall vector embedding that quantifies an overall semantic meaning for the phrase. Thus, an unlabeled, averaged/summed, phrase vector embedding 315 is generated. A second sample data set may be generated from a random selection of values from the first set of word embeddings generated for the first sample data set. The idea behind this is to break down any structure within the embeddings. The second sample data set phrases may also be processed from the first sample data set generated by using the trained word embeddings model 215 to generate a random set of vectors. Thus, an unlabeled, averaged/summed, random vector embedding 320 is generated. Both vector embeddings 315/320 may be of the same dimensionality. An example pair 350 of the first unlabeled phrase vector embedding 315 and second unlabeled random vector embedding 320 are illustrated in FIG. 3B.

The unlabeled averaged/summed phrase vector embedding 315 may be input through a first path of the SNN while the unlabeled, averaged/summed, random vector embedding 320 may be input a second path of the SNN. As each of the inputs 315/320 are unlabeled, the training technique 300 may be considered an unsupervised SNN approach. Each path of the SNN may include one or more LSTM stages 325. As shown in FIG. 3A, the SNN may include three stages of LSTMs having 40 units each. This part of the SNN may take the two vector embeddings 315/320 as inputs and process the vector embeddings 315/320 through the three paired stages of LSTMs 325, where the weights may be shared between each pair of LSTMs 325 while training the similarity model. The outputs of each LSTM 325 may be provided in parallel to a subtraction layer 330, where the subtraction may combine the inputs of each of the two paths. The result of the subtraction layer 330 may be further provided an additional LSTM 335 having 20 units, which may generate an output via a dense neural network layer with a sigmoid output function. Finally, a contrastive loss function 340 may output a distance 345 between the input phrase/sentence embeddings 315/320. A smaller distance output by the contrastive loss function 340 may indicate greater similarity between inputs while a larger distance may indicate less similarity. Contrastive loss may be defined by the following equation, where Y is the value of the label, $D_w$ is the Euclidean distance between, and m is the margin:

$$(1-Y)\frac{1}{2}(D_w)^2 + (Y)\frac{1}{2}\{\max(0, m-D_w)\}^2$$

The weights input to each of the LSTMs may be adjusted to maximize the distance 345 between the (real) averaged/summed phrase vector embedding 315 and the averaged/summed random vector embedding 320. In this way, the similarity model may be trained to distinguish between patterns of real data and synthetic (random) data with improved accuracy over prior techniques.

As a result of the training technique 300 described with reference to FIG. 3A to maximize the similarity model's perceived distinction between real and random data, the model may be utilized in the opposite manner to find vector embeddings that are most similar or at least more similar than other vector embeddings. Stated another way, during training of the similarity model, the weights of the LSTM stages 325 may be adjusted to find a largest distance 345 between the actual text and random text samples 315/320 using contrastive loss function 340. When using the similarity model to find similarities between the user's queried (non-catalog) item embedding vector and the existing catalog item embedding vector, the weights of the LSTM stages 325 may remain fixed, and the pre-existing catalog item having the smallest distance 345 to the non-catalog queried item may be identified as most, or at least more similar to the queried item than other pre-existing catalog items A smallest distance 345 between phrase vectors as output from the contrastive loss function may be understood to mean best matching or most similar.

FIG. 4 shows an example process 400 for using the system 100 after the word embeddings model 215 and similarity model have been trained as described with reference to FIGS. 2 and 3. In S401, a user operating the purchasing user interface 140 may generate a query 145 for non-catalog data to recommendation engine 135. The query 145 may include a collection of alphanumeric symbols and/or words forming a phrase. The recommendation engine 135 may utilize the previously trained word embeddings model 215, which may reference the custom word embeddings 240 stored in the domain corpus 125, to generate a plurality of word vector embeddings in S402 based on the query 145. Where a word of the phrase included within the query 145 cannot be matched to a word vector of the custom word embeddings 240 of the domain corpus 125, a zero vector may be assigned to that out-of-vocabulary word.

In S403, the plurality of word vector embeddings may be averaged or summed to create a phrase vector embedding that indicates an overall semantic meaning for the query 145. In S404, the phrase vector embedding may be input to the similarity model along with a plurality of catalog data phrase vector embeddings. As before, where a word of the plurality of catalog data phrases cannot be matched to a custom word vector embedding 240 of the domain corpus 125, zero vector may be assigned to that out-of-vocabulary word. As previously described with reference to FIG. 3A, the similarity model may be based on a Siamese neural network that takes two inputs. In the use case of FIG. 4, the similarity model trained in FIG. 3A may function substantially in the same manner, except that the actual text sample 315 and random text sample 320 may be substituted with the phrase vector embedding and the plurality of catalog data phrase vector embeddings. In S405, the similarity model may compute a distance between the phrase vector embedding and each of the plurality of catalog data phrase vector embeddings to identify a most semantically similar catalog data phrase vector embedding, or at least to identify a catalog data phrase vector embedding that is more similar to the phrase vector embedding than one or more other catalog data phrase vector embeddings. Having identified a semantically similar catalog data phrase vector embedding, one or more corresponding catalog entries may be retrieved from data store 175 in S406. Finally, in S407, the retrieved catalog entries may be formatted into a response 160 and forwarded to the purchasing user interface 140. Upon receipt of the response 160, the purchasing user interface 140 may display a configurable ranked list of suppliers for the catalog entries along with, for example, whether the item is in-catalog, supplier reliability, item purchase frequency, pricing for the item, on-time delivery, and the like.

Each component may include additional, different, or fewer components. For instance, while FIG. 3A shows three stages of LSTMs for each input of the SNN, additional or fewer LSTM layers may be added or removed without departing from the scope of the present subject matter.

The system 100 may be implemented with additional, different, or fewer components. For instance, system 100 may include additional components to support execution of the functions disclosed in accordance with the present subject matter.

The logic illustrated in the flow diagrams may include additional, different, or fewer operations than illustrated. The operations illustrated may be performed in an order different than illustrated.

The methods, devices, processing, circuitry, and logic described above and in the specific illustrative examples below may be implemented in many ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution in, hardware, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a non-transitory computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many ways, and may be implemented in many ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

FIG. 5 shows an example electronic communication environment 10 in which a catalog search and management system may be implemented. The electronic communication environment 10 may include a portion or all the following: one or more servers 2 and 4, one or more user devices 12, 14, and 16 associated with users 20, 22, and 24, and one or more databases 18, in communication with each other via public or private communication networks 1.

The user devices 12, 14, and 16 may be any form of mobile or fixed electronic devices including but not limited to desktop personal computer, laptop computers, tablets, mobile phones, personal digital assistants, and the like.

The one or more database 18 of FIG. 5 may be hosted in a central database server, a plurality of distributed database servers, or in cloud-based database hosts. The database 18 may be organized and implemented in any form, including but not limited to document database containing text data (and/or other types of data), lists of keywords, and/or entities, embedding space database containing embeddings (or embedding vectors) and relationships, and the like. The database 18 may be configured to store the intermediate data and/or final results for implementing the catalog search and management system.

Figure 6:
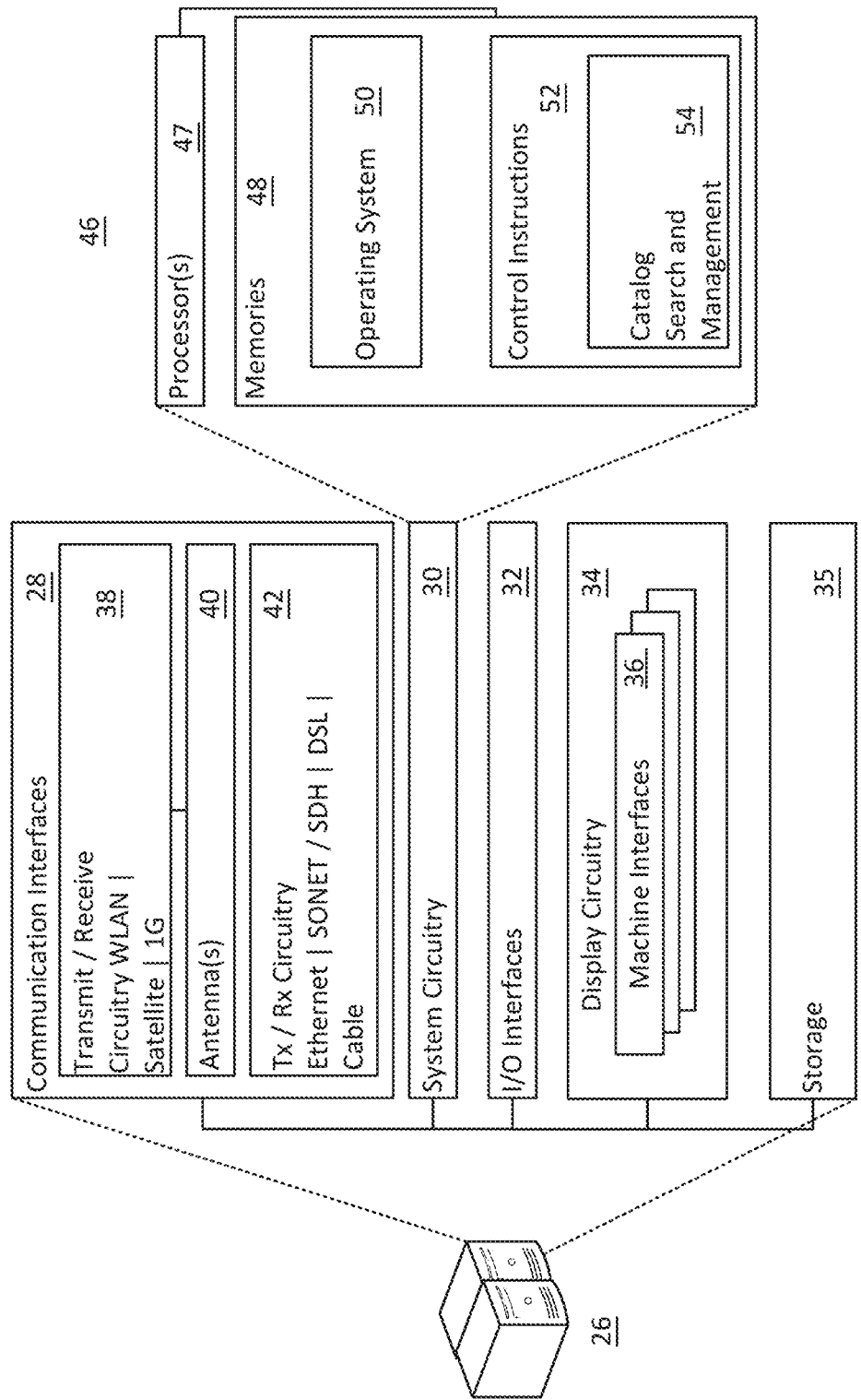
FIG. 6 illustrates computer systems that may be used to implement various components of the catalog search and management system.

FIG. 6 shows an example computer system 26 for implementing the one or more servers 2 and 4, or the user devices 12, 14, and 16. The computer system 26 may include communication interfaces 28, system circuitry 30, input/output (I/O) interfaces 32, storage/memory 35, and display circuitry 34 that generates machine interfaces 36 locally or for remote display, e.g., in a web browser running on a local or remote machine. The machine interfaces 36 and the I/O interfaces 32 may include GUIs, touch sensitive displays, voice or facial recognition inputs, buttons, switches, speakers and other user interface elements. Additional examples of the I/O interfaces 32 include microphones, video and still image cameras, headset and microphone input/output jacks, Universal Serial Bus (USB) connectors, memory card slots, and other types of inputs. The I/O interfaces 206 may further include magnetic or optical media interfaces (e.g., a CDROM or DVD drive), serial and parallel bus interfaces, and keyboard and mouse interfaces.

The communication interfaces 28 may include wireless transmitters and receivers ("transceivers") 38 and any antennas 40 used by the transmitting and receiving circuitry of the transceivers 38. The transceivers 38 and antennas 40 may support Wi-Fi network communications, for instance, under any version of IEEE 802.11, e.g., 802.11n or 802.11ac. The communication interfaces 28 may also include wireline transceivers 42. The wireline transceivers 42 may provide physical layer interfaces for any of a wide range of communication protocols, such as any type of Ethernet, data over cable service interface specification (DOCSIS), digital subscriber line (DSL), Synchronous Optical Network (SONET), or other protocol.

The storage/memory 35 may be used to store various initial, intermediate, or final data or model for implementing the catalog and search management system 100. These data may alternatively be stored in the database 18 of FIG. 5. In one implementation, the storage/memory 35 of the computer system 26 may be integral with the database 18 of FIG. 5. The storage/memory 35 may be centralized or distributed, and may be local or remote to the computer system 26. For example, the storage/memory 35 may be hosted remotely by a cloud computing service provider.

The system circuitry 30 may include hardware, software, firmware, or other circuitry in any combination. The system circuitry 30 may be implemented, for example, with one or more systems on a chip (SoC), application specific integrated circuits (ASIC), microprocessors, discrete analog and digital circuits, and other circuitry.

For example, the system circuitry 30 may be implemented as 46 for the catalog search and management system. The system circuitry 30 may include one or more processors 47 and memories 48. The memories 48 stores, for example, control instructions 52 and an operating system 50. The control instructions 52, for example may include instructions for implementing the components 54 of the catalog search and management system 100. In one implementation, the instruction processors 47 execute the control instructions 52 and the operating system 50 to carry out any desired functionality related to the catalog search and management system.

To clarify the use of and to hereby provide notice to the public, the phrases "at least one of <A>, <B>, . . . and <N>" or "at least one of <A>, <B>, . . . or <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

What is claimed is:

1. A system comprising:
   a processor;
   a memory in communication with the processor, the memory storing a plurality of instructions executable by the processor to cause the system to:

receive a non-catalog query from a user interface;
compare the non-catalog query with a plurality of catalog data vector embeddings stored in a domain corpus using a similarity machine learning model comprising a Siamese neural network;
map the non-catalog query to a semantically similar catalog data vector embedding of the plurality of catalog data vector embeddings using the similarity machine learning model;
retrieve an item entry from a data store using the semantically similar catalog data vector embedding, wherein the item entry comprises a description and a supplier of an item;
generate a response to the non-catalog query comprising the retrieved item entry; and
transmit the response to the user interface.

2. The system of claim 1, wherein
the non-catalog query is a phrase comprising a plurality of words; and
the memory further comprises instructions executable by the processor to cause the system to:
process the phrase using a word embeddings model to generate a plurality of word vector embeddings for each word of the phrase.

3. The system of claim 2, wherein the memory further comprises instructions executable by the processor to cause the system to:
average or sum the plurality of word vector embeddings to generate a phrase vector embedding.

4. The system of claim 3, wherein the memory further comprises instructions executable by the processor to cause the system to:
input the phrase vector embedding into a first input path of the similarity machine learning model.

5. The system of claim 4, wherein
the first input path of the similarity machine learning model comprises:
a Siamese neural network comprising a plurality of long short-term memory (LSTM) stages.

6. The system of claim 5, wherein
the plurality of LSTM stages is a first plurality of LSTM stages; and the system further comprises:
a second parallel input path of the similarity machine learning model comprises a second plurality of LSTM stages corresponding to the LSTM stages of the first input path.

7. The system of claim 4, wherein the memory further comprises instructions executable by the processor to cause the system to:
input the plurality of catalog data vector embeddings into a second parallel input path of the similarity machine learning model.

8. The system of claim 7, wherein the memory further comprises instructions executable by the processor to cause the system to:
determine, using the similarity machine learning model, a distance between the phrase vector embedding and the plurality of catalog data vector embeddings.

9. The system of claim 8, wherein the memory further comprises instructions executable by the processor to cause the system to:
identify the semantically similar catalog data vector embedding of the plurality of catalog data vector embeddings having a smaller distance than a second catalog data vector embedding of the plurality of catalog data vector embeddings.

10. A method comprising:
receiving a non-catalog query from a user interface;
comparing the non-catalog query with a plurality of catalog data vector embeddings stored in a domain corpus using a similarity machine learning model comprising a Siamese neural network;
mapping the non-catalog query to a semantically similar catalog data vector embedding of the plurality of catalog data vector embeddings using the similarity machine learning model;
retrieving an item entry from a data store using the semantically similar catalog data vector embedding, wherein the item entry comprises a description and a supplier of an item;
generating a response to the non-catalog query comprising the retrieved item entry; and
transmitting the response to the user interface, wherein the non-catalog query is for items, requests, or acquisitions that have no defined catalog entries.

11. The method of claim 10, wherein
the non-catalog query is a phrase comprising a plurality of words; and the method further comprises:
processing the phrase using a word embeddings model to generate a plurality of word vector embeddings for each word of the phrase.

12. The method of claim 11, further comprising:
averaging or summing the plurality of word vector embeddings to generate a phrase vector embedding.

13. The method of claim 12, further comprising:
inputting the phrase vector embedding into a first input path of the similarity machine learning model.

14. The method of claim 13, wherein
the first input path of the similarity machine learning model comprises:
a Siamese neural network comprising a plurality of long short-term memory (LSTM) stages.

15. The method of claim 14, wherein
the plurality of LSTM stages is a first plurality of LSTM stages; and
a second parallel input path of the similarity machine learning model comprises a second plurality of LSTM stages corresponding to the LSTM stages of the first input path.

16. The method of claim 13, further comprising:
inputting the plurality of catalog data vector embeddings into a second parallel input path of the similarity machine learning model.

17. The method of claim 16, further comprising:
determining, using the similarity machine learning model, a distance between the phrase vector embedding and the plurality of catalog data vector embeddings.

18. The method of claim 17, further comprising:
identifying the semantically similar catalog data vector embedding of the plurality of catalog data vector embeddings having a smaller distance than a second catalog data vector embedding of the plurality of catalog data vector embeddings.

* * * * *